United States Patent
Takeda et al.

(10) Patent No.: US 6,438,620 B2
(45) Date of Patent: Aug. 20, 2002

(54) SOFTWARE LINKING SYSTEM IN INFORMATION PROCESSOR

(75) Inventors: Satoshi Takeda; Taiji Tsuchida; Kazutomo Naganuma; Junichi Yokosato; Yasuhiro Suzuki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/077,801

(22) PCT Filed: Oct. 29, 1996

(86) PCT No.: PCT/JP96/03168
§ 371 (c)(1),
(2), (4) Date: Jun. 15, 1998

(87) PCT Pub. No.: WO98/19235
PCT Pub. Date: May 7, 1998

(51) Int. Cl.[7] .................................................. G06F 9/54
(52) U.S. Cl. ....................................... 709/331; 717/162
(58) Field of Search ...................... 717/10, 2, 162–167; 709/300–305, 331, 332; 395/710

(56) References Cited

U.S. PATENT DOCUMENTS

| | | | | |
|---|---|---|---|---|
| 5,404,534 A | * | 4/1995 | Foss et al. ................... | 709/303 |
| 5,659,751 A | * | 8/1997 | Heninger .................... | 709/332 |
| 5,787,448 A | * | 7/1998 | Anderson et al. ........... | 707/501 |
| 5,828,884 A | * | 10/1998 | Lee et al. ................... | 395/705 |
| 5,845,119 A | * | 12/1998 | Kozuka et al. ............... | 717/2 |

FOREIGN PATENT DOCUMENTS

| | | |
|---|---|---|
| GB | 2306870 A | 5/1997 |
| GB | 2317471 A | 3/1998 |
| JP | 4-220768 | 8/1992 |
| JP | 5298052 A | 11/1993 |
| JP | 7134693 A | 5/1995 |
| JP | 8153010 A | 6/1996 |

OTHER PUBLICATIONS

Nikkei Multimedia, Jun., 1996 pp. 100–101. Bernard J. Haan, et al, IRIS Hyper Media Services Communication of ACM, Jan., 1992/vol. No. 1 pp. 38–51.

Nikkei Byte No. 96, Feb. 1992 (Nikkei BP Inc.) Y. Akiyama—"Inner Mechanism of OLE and Structure of Application Link", pp. 244–252.

* cited by examiner

*Primary Examiner*—St. John Courtenay, III
*Assistant Examiner*—Van H. Nguyen

(57) ABSTRACT

A software linking system in an information processor having an operating system in which plural sets of software are operable, includes an information obtaining means for obtaining information within the information processor, an anchor identifying means for judging whether or not there exists anchor information for specifying a linkage condition under which linking-source software recognizes linked software on the basis of the information obtained by the information obtaining means, and a linkage executing means for executing the linked software performing a linking operation corresponding to the anchor information identified by the anchor identifying means, whereby an anchor process is executed outside the linking software without changing the linking software and a file in a format thereof with the result that the software runs both on a linking source side and on a linked side.

16 Claims, 22 Drawing Sheets

| ANCHOR ID | NAME OF SOFTWARE |
|---|---|
| 1 | SOFTWARE A |
| 2 | SOFTWARE B |

| ANCHOR ID | NAME OF LINKED SOFTWARE | NAME OF OPEN FILE | WINDOW STATUS |
|---|---|---|---|
| 1 | SOFTWARE B | FILE B1 | |
| 2 | SOFTWARE C | FILE C1 | |
| 1 | SOFTWARE C | FILE C2 | MAXIMIZATION |
| 2 | SOFTWARE D | | |

FIG. 16

| NAME OF LINKING-SOURCE SOFTWARE | NAME OF OBJECT | OBTAINED CONTENT |
|---|---|---|
| SOFTWARE A | OBJECT A1 | DISPLAY PAGE NUMBER |
| SOFTWARE B | OBJECT B1 | NAME OF OPEN FILE |

FIG. 17

| NAME OF LINKING-SOURCE SOFTWARE | NAME OF VARIABLE | OBTAINED CONTENT |
|---|---|---|
| SOFTWARE A | VARIABLE A1 | DISPLAY PAGE NUMBER |
| SOFTWARE B | VARIABLE B1 | NAME OF OPEN FILE |

FIG. 18

| OBTAINED ADDRESS | OBTAINED CONTENT |
|---|---|
| 0x40000000 | DISPLAY PAGE NUMBER OF SOFTWARE A |
| 0x60000000 | NAME OF OPEN FILE OF SOFTWARE B |

FIG. 19

| NAME OF FILE | OBTAINED CONTENT |
|---|---|
| ProgramA.log | DISPLAY PAGE NUMBER OF SOFTWARE A |
| ProgramB.tmp | NAME OF OPEN FILE OF SOFTWARE B |

FIG. 20

| ANCHOR ID | EVENT |
|---|---|
| 1 | MOUSE BUTTON-DOWN |
| 2 | MOUSE SHIFT |
| 3 | KEY INPUT |
| 4 | WINDOW ACTIVE |

FIG. 21

| ANCHOR ID | COORDINATES |
|---|---|
| 1 | X-COORDINATE $\leq$ 200<br>Y-COORDINATE $\leq$ 50 |
| 2 | $500 \leq$ X-COORDINATE $\leq 1000$<br>$200 \leq$ Y-COORDINATE $\leq 500$ |

FIG. 22

| ANCHOR ID | KEY INFORMATION |
|---|---|
| 1 | [Ctrl+A] |
| 2 | [Ctrl+B] |

FIG. 23

| ANCHOR ID | WINDOW STATUS |
|---|---|
| 1 | DISPLAYING IN ICON |
| 2 | MAXIMIZING |

FIG. 24

| ANCHOR ID | NAME OF OBJECT |
|---|---|
| 1 | OBJECT A1 |
| 2 | OBJECT B1 |

FIG. 25

| ANCHOR ID | NAME OF OPEN FILE |
|---|---|
| 1 | FILE A1 |
| 2 | FILE B1 |

FIG. 26

| ANCHOR ID | PAGE NUMBER |
|---|---|
| 1 | 1 |
| 2 | 3 |

FIG. 27

| ANCHOR ID | NAME OF SOFTWARE | EVENT | COORDINATES | KEY INFORMATION | WINDOW STATUS | NAME OF OBJECT | NAME OF OPEN FILE | PAGE NUMBER |
|---|---|---|---|---|---|---|---|---|
| 1 | SOFTWARE A | MOUSE BUTTON-DOWN | X-COORDINATE ≦ 200  Y-COORDINATE ≦ 50 | | | | | |
| 2 | SOFTWARE B | | | | DISPLAYING IN ICON | | | |
| 3 | SOFTWARE B | | | | | OBJECT B1 | FILE B1 | 2 |
| 4 | | KEY INPUT | | [Ctrl+9] | | | | |

SOFTWARE LINKING SYSTEM IN INFORMATION PROCESSOR

This application is the national phase under 35 U.S.C. §371 of prior PCT International Application No. PCT/JP96/03168 which has an International filing date of Oct. 29, 1996 which designated the United States of America, the entire contents of which are hereby incorporated by reference.

TECHNICAL FIELD

The present invention relates generally to an information processor having an operating system in which plural sets of software are simultaneously operable and, more particularly, to a software linking system in the information processor, wherein the software can be operated in linkage with other software by obtaining information of the software in the process of operation.

BACKGROUND ART

FIG. 35 is a diagram showing an example of a screen of a hyper media type software linking system using Object Linking and Embedding (hereinafter abbreviated to OLE) known as a software linking technology of the Microsoft Corporation.

Herein, the hyper media is defined such that a linkage is actualized by incorporating, into the linking-source software, information such as anchor information for recognizing the linked software performing a linking operation for the linkage. To be specific, as in the screen example shown in FIG. 35, linking-source software A112 pastes and displays a part of a file BB115 in a software format B114 on a window in which a file AA113 in its own format is opened, and, when an event through a mouse 111 occurs in a portion of the file BB115 on the software A112, opens the file BB115 by starting up the software B114 defined as original software of the file BB115 as the linked software, thus effecting a window display.

As explained above, the conventional software linking system using the OLE involves the operation of previously pasting the file BB115 in the linked software B114 format to the file AA113 in the linking-source software A112 format, and executes the software linkage with a pasted content used as anchor information. Information of the pasted content and the information such as the linked software are retained in the file AA113 in the linking-source software A112.

A function of processing an anchor, which is needed for linking the software, exists only within the software, and the anchor process is separately incorporated per software and executed. Hence, the software having no OLE function is unable to retain the anchor information and is not therefore qualified to become the linking-source software.

Accordingly, it is an object of the present invention, which has been contrived to obviate the problems as described above, to provide a software linking system in an information processor, in which the software runs both on a linking-source side and on a linked side by executing the anchor process outside the linking software without changing the linking software and a file in a format thereof.

SUMMARY OF THE INVENTION

To accomplish the above-described object, a software linking system in an information processor according to the present invention has the information processor having an operating system in which plural sets of software are simultaneously operable, and comprises an information obtaining means for obtaining information within the information processor, an anchor identifying means for judging whether or not there exists anchor information for specifying a linkage condition under which linking-source software recognizes linked software on the basis of the information obtained by the information obtaining means, and a linkage executing means for executing the linked software performing a linking operation corresponding to the anchor information identified by the anchor identifying means.

Further, the information obtaining means is characterized by comprising an information obtainment registering unit for registering the operating system with an information obtainment in order to receive, instead of the linking-source software, the information sent by the operating system of the information processor, and an information receiving unit for receiving the information sent from the operating system.

Moreover, the information obtaining means is characterized by comprising a transparent window unit for covering a window displayed on a screen by the linking-source software, and a window information obtaining unit for obtaining information inputted to the transparent window unit.

Furthermore, the information obtaining means is characterized by comprising an obtained information table storage unit in which information to be obtained is registered and accumulated, and an information obtaining unit for obtaining the information registered in the obtained information table storage unit.

Further, the anchor identifying means is characterized by comprising an anchor information table storage unit in which the anchor information is registered and accumulated, and an anchor collating unit for collating the information obtained by the information obtaining means with the information existing in the anchor information table storage unit.

Additionally, the anchor identifying means is characterized by further comprising an information sending unit for sending, if there exists no such anchor information that the information obtained by the information obtaining means meets with the condition, the information to a program of the linking-source software.

Furthermore, the anchor identifying means is characterized by further comprising an anchor registering unit for registering the anchor information table storage unit with the anchor information.

Moreover, the anchor identifying means is characterized by further comprising an obtained information accumulating means for accumulating the information obtained by the information obtaining means, and the anchor collating unit makes the anchor collation possible based on a combination of plural pieces of information accumulated in the obtained information accumulating means.

Furthermore, the anchor identifying means is characterized by further comprising a linkage anchor accumulating unit for accumulating all the anchor information judged to meet with the condition in the anchor collating unit and outputting the anchor information to the linkage executing means.

Additionally, the linkage executing means is characterized by comprising a linkage information table storage unit for registering and accumulating the software linkage information, a linkage information obtaining unit for obtaining, from the linkage information table storage unit, the software linkage information corresponding to the anchor information obtained from the anchor identifying means, and a linkage information executing unit for issuing an execution command to the linked software from the software linkage information obtained by the linkage information obtaining unit.

The software linking system in the information processor is characterized by further comprising an anchor displaying means for displaying on a screen the anchor information identified or registered and accumulated by the anchor identifying means.

Moreover, a software linking system in an information processor according to another aspect of the present invention has the information processor having an operating system in which plural sets of software are simultaneously operable, and comprises a file converting means for converting a file of the linking-source software or a content displayed in a window into an anchor-identifiable software format, and a linkage executing means for executing the linked software corresponding to the anchor information identified by the anchor-identifiable software.

The present invention will become more fully understood from the detailed description given hereunder and the accompanying drawings which are given by way of illustration only, and thus are not limitative of the present invention, and wherein:

BRIEF DESCRIPTION OF THE DRAWINGS

FIG. 16 is an explanatory diagram showing an obtained information table when obtaining information of an object of the software;

FIG. 17 is an explanatory diagram showing an obtained information table when receiving the information from a variable disclosed outside by the software;

FIG. 18 is an explanatory diagram showing an obtained information table when obtaining information of a specified address in a memory within the information processor;

FIG. 19 is an explanatory diagram showing an obtained information table when obtaining the information from a file created by the software;

FIG. 20 is an explanatory diagram showing an anchor information table in which an event is set as an item of the anchor information;

FIG. 21 is an explanatory diagram showing the anchor information table in which coordinates are set as an item of the anchor information;

FIG. 22 is an explanatory diagram showing the anchor information table in which key information is set as an item of the anchor information;

FIG. 23 is an explanatory diagram showing the anchor information table in which a window status is set as an item of the anchor information;

FIG. 24 is an explanatory diagram showing the anchor information table in which a name of object is set as an item of the anchor information;

FIG. 25 is an explanatory diagram showing the anchor information table in which a name of file being opened is set as an item of the anchor information;

FIG. 26 is an explanatory diagram showing the anchor information table in which a page number is set as an item of the anchor information;

FIG. 27 is an explanatory diagram showing the anchor information table in which all pieces of information in FIG. 8 and FIGS. 20 to 26 are set as items of the anchor information;

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODE FOR CARRYING OUT THE INVENTION

Embodiment 1

An embodiment 1 of the present invention will be hereinafter discussed.

Figure 1:
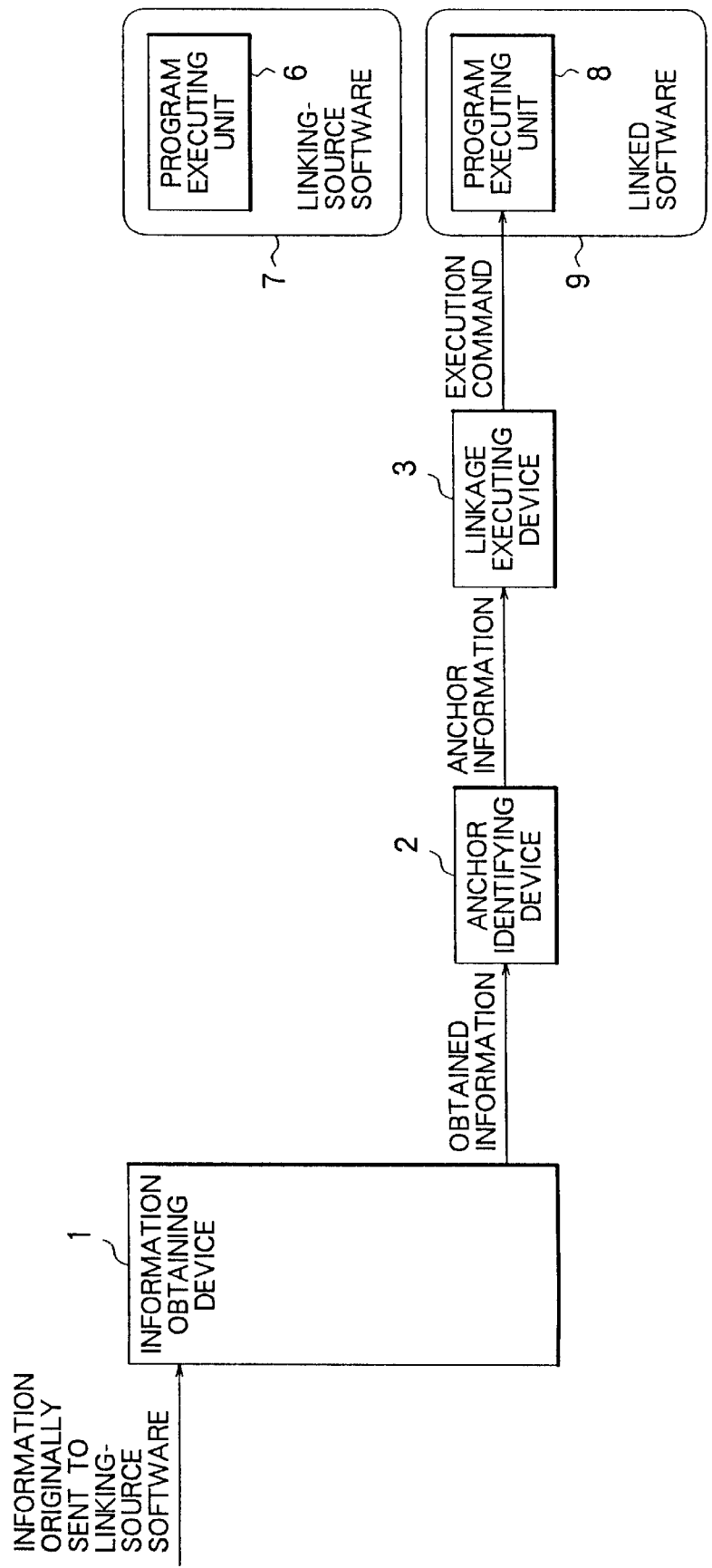
FIG. 1 is a diagram showing a construction of a software linking system in an information processor according to the present invention.

FIG. 1 is a diagram showing a construction of a software linking system in the embodiment 1.

The software linking system illustrated in FIG. 1 is, in an information processor including an operating system in which linking-source software 7 and linked software 9 are simultaneously operable, capable of obtaining information of the linking-source software 7 in the process of operation and enables the linked software 9 to operate in linkage. The software linking system is constructed of an information obtaining device 1 for obtaining information within the information processor, i.e., the information originally sent to the linking-source software 7, an anchor identifying device 2 for judging whether or not there exists anchor information for specifying a linkage condition under which the linking-source software 7 recognizes the linked software 9 on the basis of the information obtained by the information obtaining device 1, and a linkage executing device 3 for outputting an execution command to a program executing unit 8 for executing the linked software 9 which performs the linking operation corresponding to the anchor information identified by the anchor identifying device 2. Note that the numeral 6 in FIG. 1 designates a program executing unit for executing the linking-source software 7.

Figure 2:
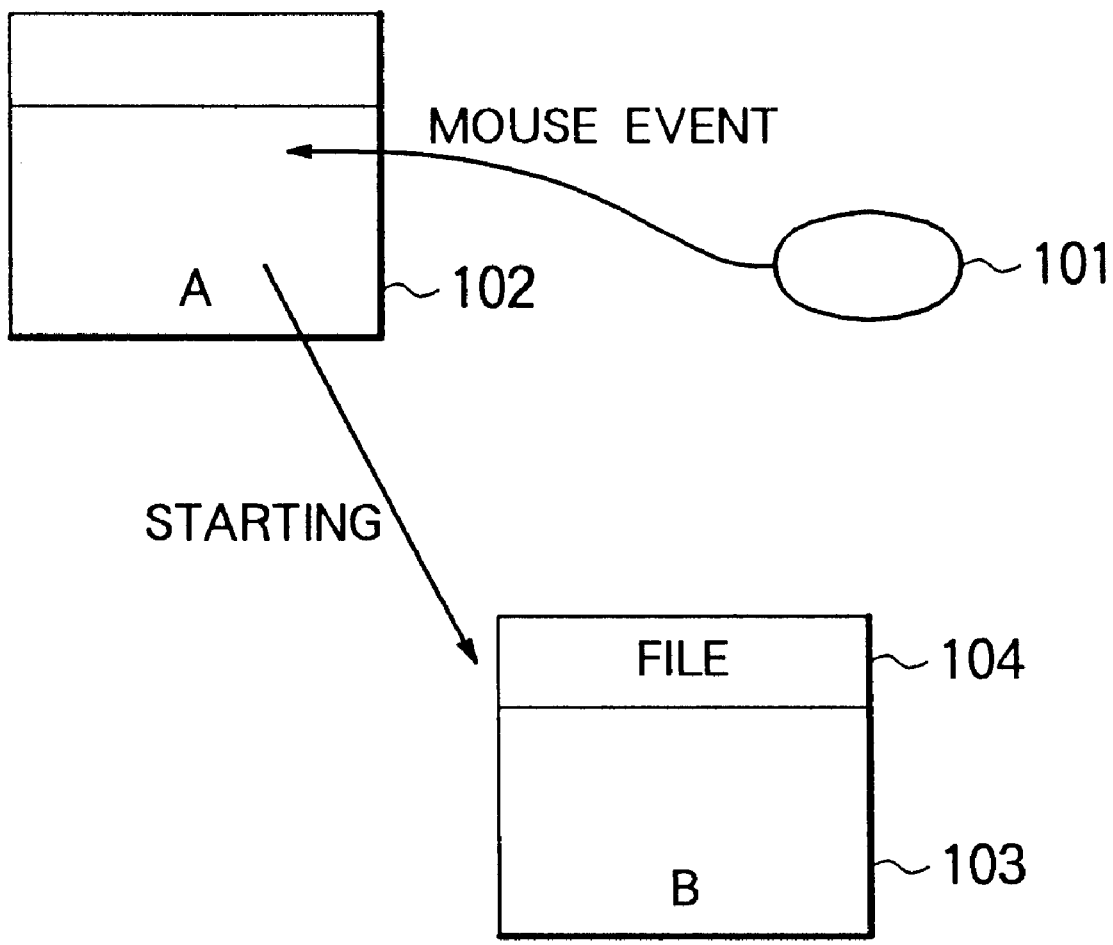
FIG. 2 is an explanatory diagram showing an example of a screen of a software linkage by an operation of a mouse.
Figure 3:
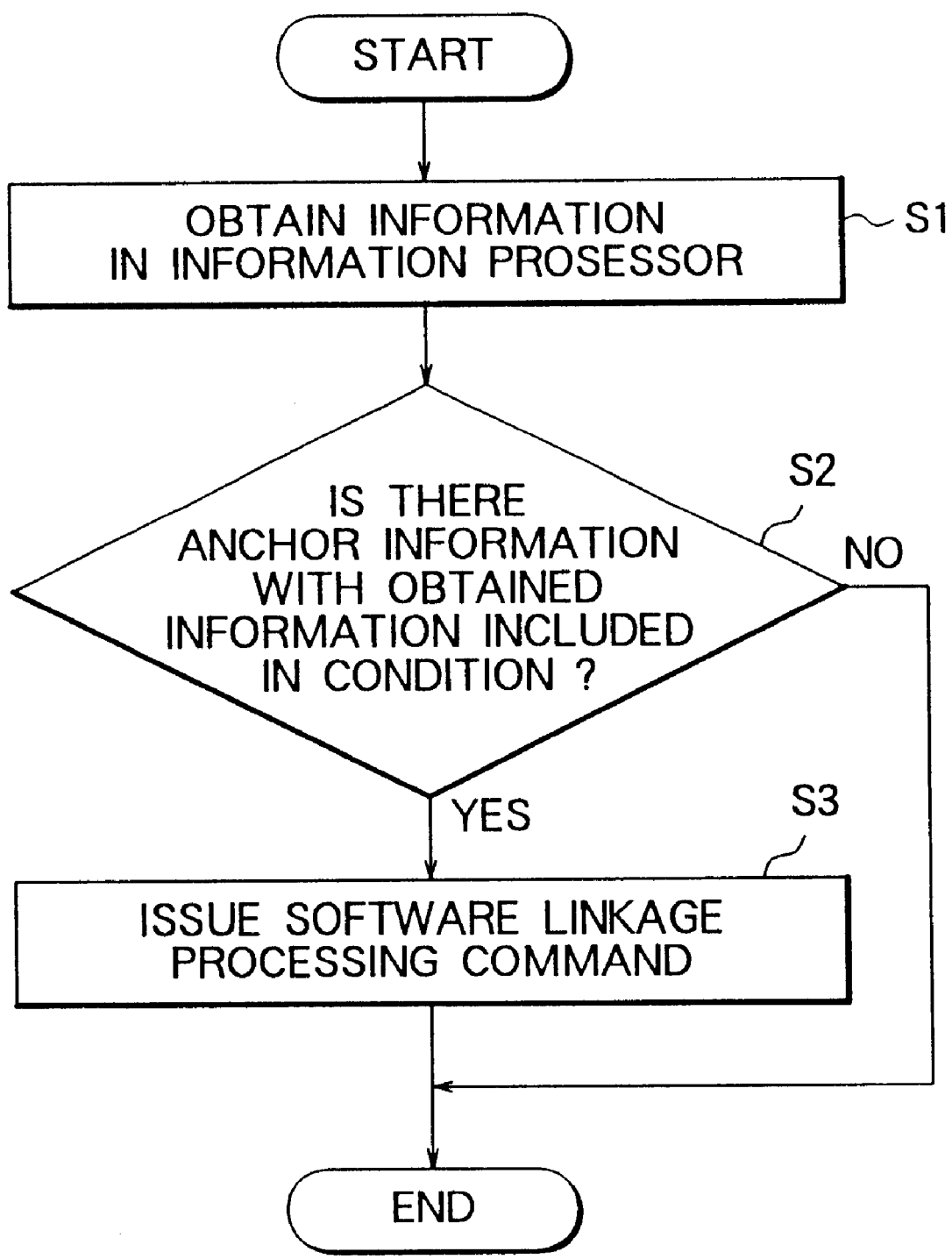
FIG. 3 is a flowchart showing an operation of the software linking system in an embodiment 1 of the present invention.

FIG. 2 shows an example of a screen on which the software is set into the linking operation by a user inputting the information through an inputting means, wherein a file 104 of software B103 is displayed in a window when the user inputs to software A102 by use of a mouse 101. At this time, the software linking system is in an operation flow as shown in FIG. 3. Incidentally, the inputting means may be, e.g., a keyboard, a light pen, a trackball, or the like other than the mouse 101.

Next, the operation of the software linking system in this embodiment will be explained with reference to a flowchart shown in FIG. 3.

When inputted by the user, to start with, in step S1, the information obtaining device 1 obtains input information. This piece of inputted information can be, though originally inputted by the user to the linking-source software 7, obtained by the information obtaining device 1 replacing the linking-source software 7 in the present software linking system. The input information is inputted from the input device of the information processor 1 and not particularly limited. The input information may be exemplified by, e.g., a classification of a mouse event, input coordinates of the mouse, a name of event target software, etc.

Next, in step S2, the anchor identifying device 2 distinguishes whether or not there exists anchor information containing the input information included in the condition. The anchor information is information by which the linking-source software 7 recognizes the linked software 9. The anchor information is, in addition to the input information described above, information intrinsic to the software and has items such as a name of an open file and a page number. If the anchor information exists, in step S3, the linkage executing device 3 gives a command to process the linkage information corresponding to the anchor information. Items of the linkage information are, e.g., a name of the linked software and a name of the file to be opened, and so on.

In the screen example shown in FIG. 2, to begin with, the information obtaining device 1 in place of the software A102 obtains the mouse event by the mouse 101 with respect to the software A102, and next the anchor identifying device 2 confirms whether or not there exists the anchor information with respect to the mouse event. Finally, the linkage executing device 3 obtains the linkage information such as "open the file 104 by starting up the software B103", corresponding to the anchor information, and gives a command to process this piece of linkage information.

Herein, an internal configuration and an operation flow of the information obtaining device 1 will be described with reference to FIGS. 4 and 5.

Figure 4:
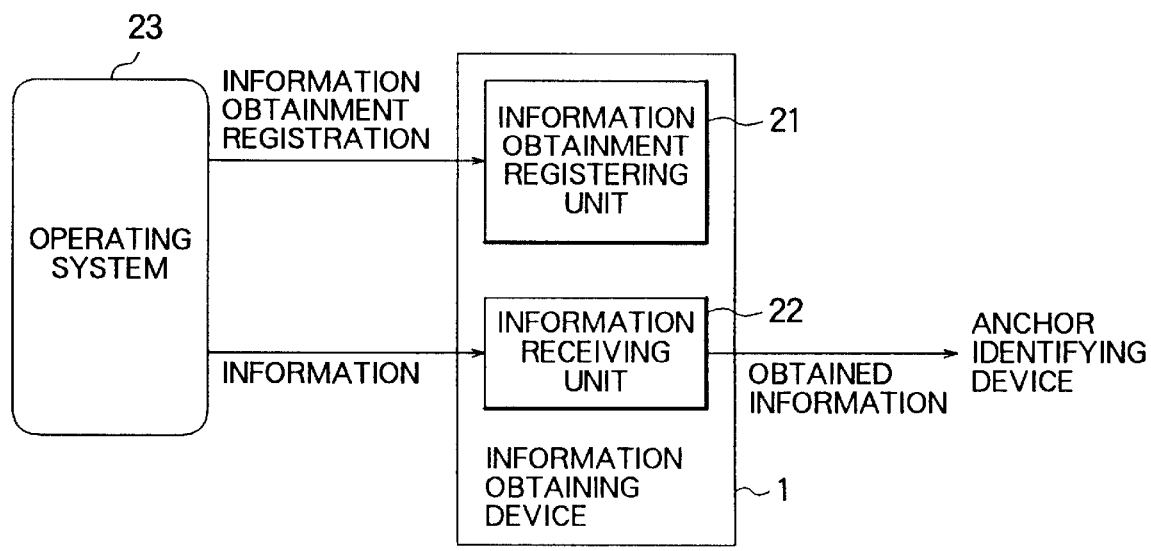
FIG. 4 is a diagram illustrating an internal construction of an information obtaining device for obtaining information from an operating system.

As shown in FIG. 4, the information obtaining device 1 includes as internal components thereof an information obtainment registering unit 21 for registering an operating system 23 with an obtainment of information in order to receive in place of the linking-source software 7 the information issued by the operating system 23 of the information processor, and an information receiving unit 22 for receiving the information from the operating system 23.

Figure 5:
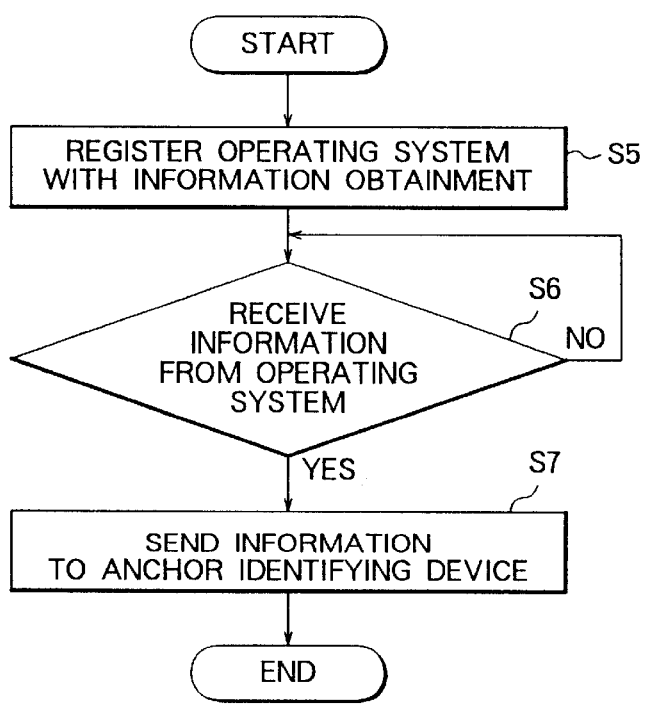
FIG. 5 is a flowchart showing the operation of the information obtaining device for obtaining the information from the operating system.

This information obtaining device 1, as shown in FIG. 5, upon a start of the present software linking system, at the first onset, in step S5, makes the information obtainment registering unit 21 register the operating system with such an effect that a destination of the information possessed by the operating system 23 is set to the present software linking system. The operating system 23 is, though not particularly limited, for example, UNIX® or Windows®. A registering method may be, e.g., a hook function of Microsoft Windows® or the like. Next, if there is the input information of the user of the information concerned, in step S6, the information receiving unit 22 receives the information from the operating system 23, and in step S7 transmits the obtained information to the anchor identifying device 2.

Further, an internal configuration and an operation flow of the anchor identifying device 2 will be explained referring to FIGS. 6 and 7.

Figure 6:
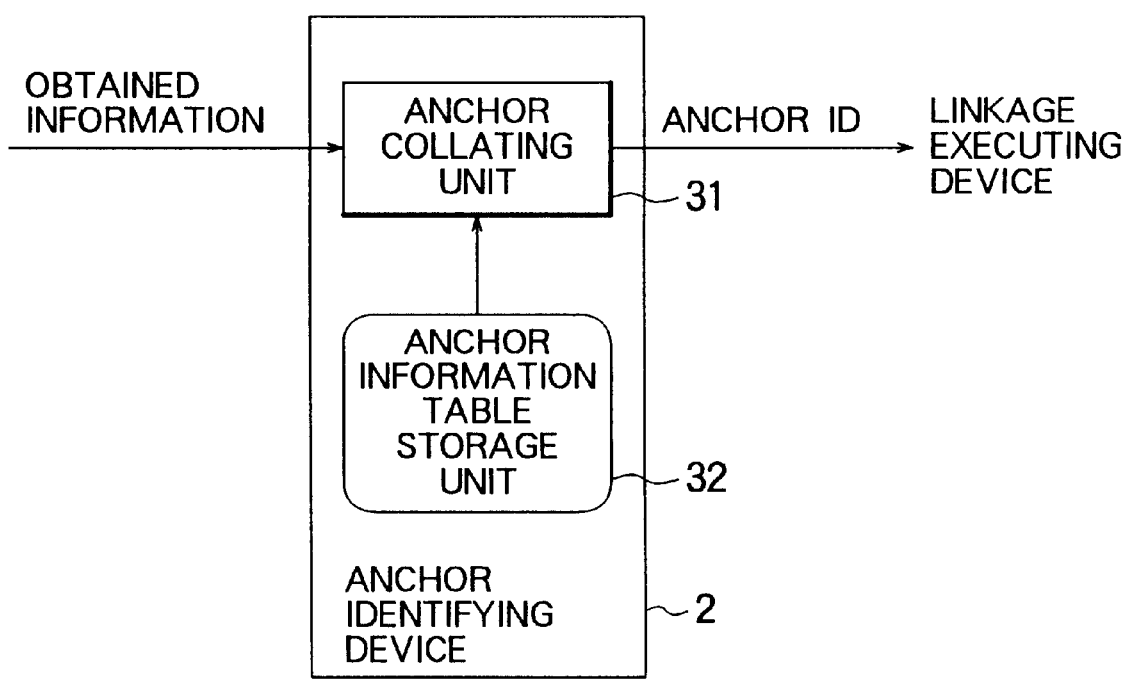
FIG. 6 is a diagram showing an internal construction of an anchor identifying device.

As shown in FIG. 6, the anchor identifying device 2 includes as internal components an anchor information table storage unit 32 in which the anchor information is registered and accumulated, and an anchor collating unit 31 for collating the information obtained by the information obtaining device 1 with the information in the anchor information table storage unit 32.

Figure 7:
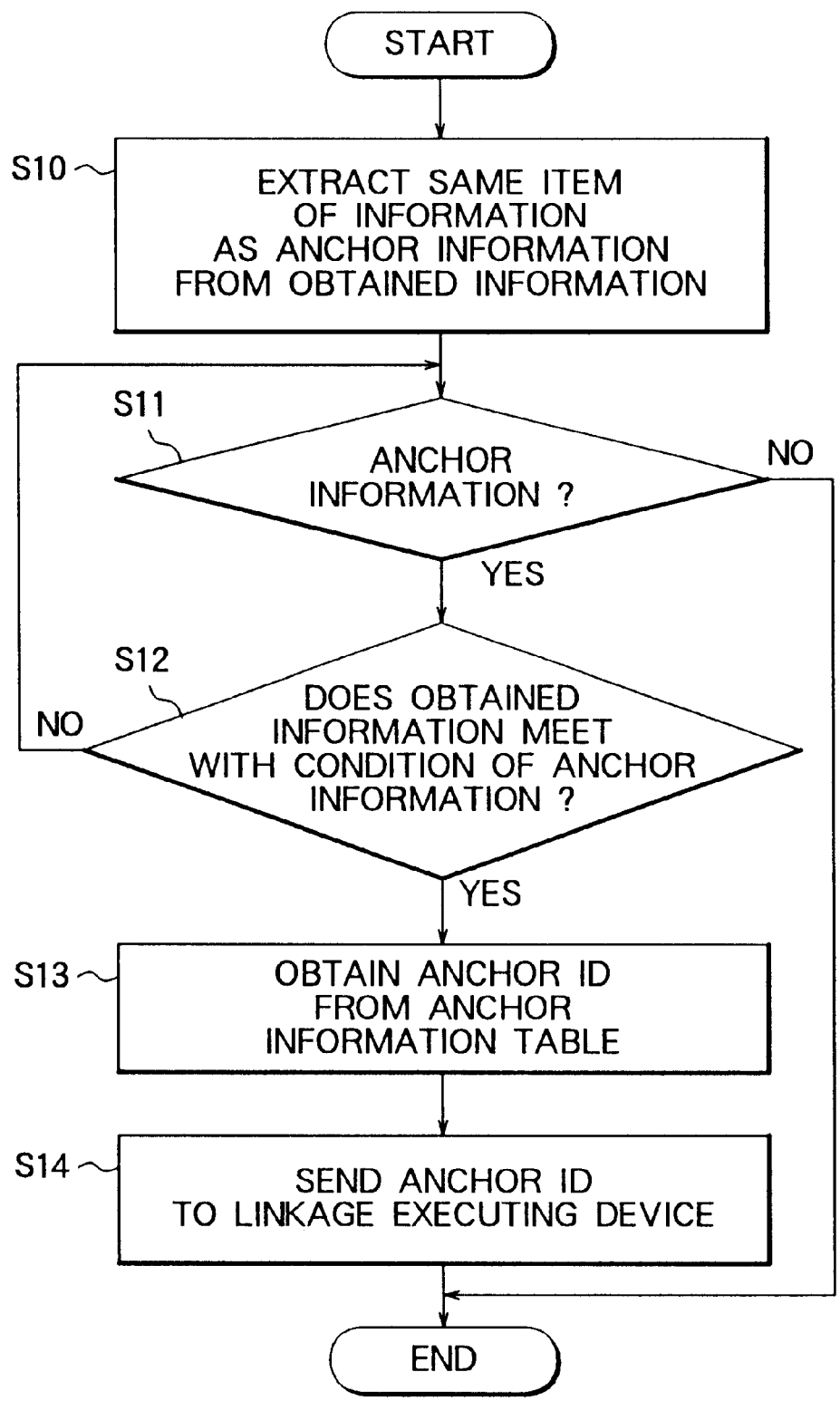
FIG. 7 is a flowchart showing an operation of the anchor identifying device.

The anchor identifying device 2, as shown in FIG. 7, to begin with, in step S10, makes the anchor collating unit 31 extract information that might possibly become the anchor information out of pieces of information obtained by the information obtaining device 1. Next, in step S11, the anchor identifying device 2 fetches the anchor information registered in the anchor information table storage unit 32, and in step S12 confirms whether or not the obtained information satisfies the condition of the anchor information. If the obtained information meets with the condition of the anchor information, in step S13, the anchor identifying device 2 obtains an anchor ID corresponding to the anchor information, and in step S14 transmits the anchor ID to the linkage executing device 3.

Figures 8, 9:
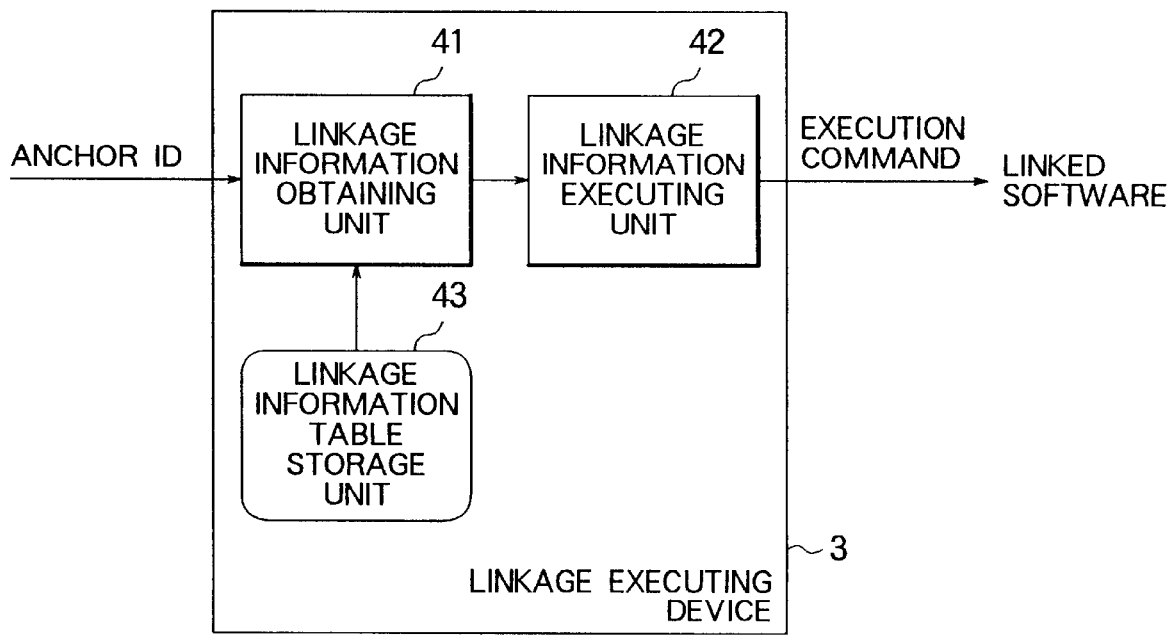
FIG. 8 is a explanatory diagram showing an anchor information table in which a name of software is defined as an item of anchor information.
FIG. 9 is a diagram showing an internal construction of a linkage executing device.

At this time, as an anchor information table stored in the anchor information table storage unit 32 when the item of the anchor information is assumed to be a name of software, as shown in FIG. 8, the software name is written corresponding to the anchor ID. Note that this anchor information table can be also registered and accumulated in the form of, e.g., an outside file so that the user can freely change the definition.

Furthermore, an internal configuration and an operation flow of the linkage executing device 3 will be explained with reference to FIGS. 9 and 10.

As illustrated in FIG. 9, the linkage executing device 3 includes as internal components a linkage information table storage unit 43 for registering and accumulating the software linkage information, a linkage information obtaining unit 41 for obtaining from the linkage information table storage unit 43 the software linkage information corresponding to the anchor information (the anchor ID) obtained from the anchor identifying device 2, and a linkage information executing unit 42 for issuing an execution command to the linked software from the software linkage information obtained by the linkage information obtaining unit 41.

Figures 10, 11:
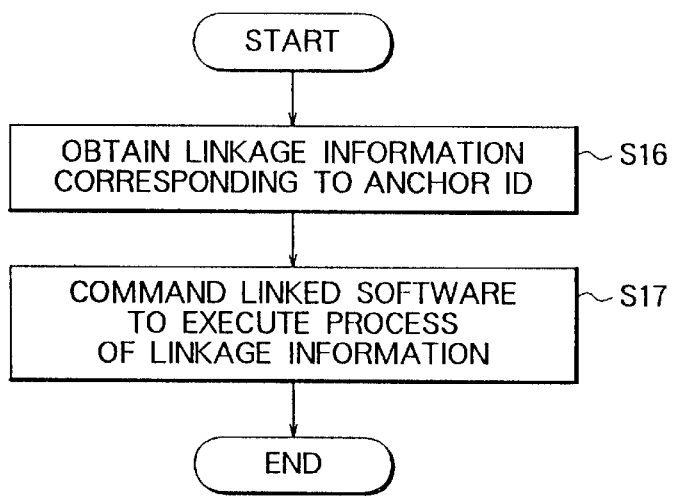
FIG. 10 is a flowchart showing an operation of the linkage executing device.
FIG. 11 is an explanatory diagram showing a linkage information table.

This linkage executing device 3, as shown in FIG. 10, to begin with, in step S16, makes the linkage information obtaining unit 41 obtain from the linkage information table storage unit 43 the linkage information corresponding to the anchor ID sent from the anchor information identifying device 2. Next, in step S17, the linkage information executing unit 42 issues, to the program executing unit 8 of the linked software 9, a command to execute the process of the linkage information.

The items of the information serving as the linkage information stored in the linkage information table storage unit 43 are, as shown in FIG. 11, e.g., a name of the linked software corresponding to the anchor ID, a name of file to be opened, and a window status of the linked software. Among these items of information, the information, such as the name of linked software, for specifying the linked software is conceived as indispensable information, and other items of information are processed only when they are set. Note that this linkage information table storage unit 43 is capable of registering and accumulating the information as, e.g., an outside file so that the user can freely change the definition.

Accordingly, in accordance with the embodiment 1, instead, the information obtaining device 1 obtains the information to the linking-source software 7 from the operating system 23, and the anchor identifying device 2 identifies the anchor information outside the linking-source software 7, whereby the software linkage can be actualized without changing the linking-source software 7 itself.

Further, the anchor identifying device 2 sets the name of software as an item of the anchor information, whereby the software linkage in which the linking-source software 7 is specified can be actualized. The linking process can be thereby individually executed for all sets of software operating within the information processor from outside without changing the software itself.

Embodiment 2

The embodiment 1 discussed above has dealt with the case where the information obtaining device 1 receives the information from the operating system 23. It is also, however, feasible to obtain the window event for the linking-source software 7 from a transparent window instead of the linking-source source software 7 by displaying the transparent window so as to cover the window displayed on the screen by the linking-source software 7. A covering way in which the transparent window covers the display screen of the linking-source software 7, is not particularly limited.

An internal configuration and an operation flow of the information obtaining device 1 in the embodiment 2 will be described with reference to FIGS. 12 and 13.

Figure 12:
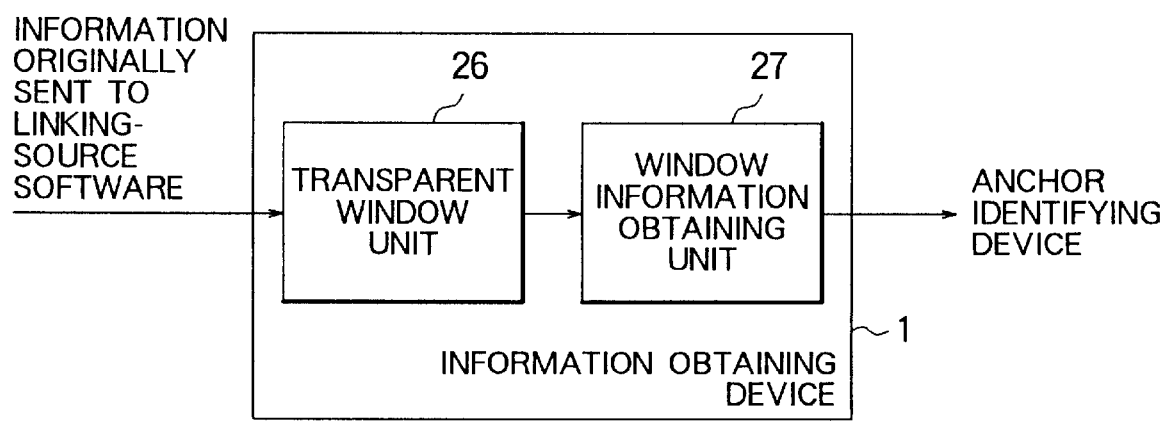
FIG. 12 is a diagram showing an internal construction of an information obtaining device for obtaining information through a transparent window.

As shown in FIG. 12, the information obtaining device 1 includes as internal components a transparent window unit 26 for covering the window displayed on the screen by the linking-source software, and a window information obtaining unit 27 for obtaining the information inputted to the transparent window unit 26.

Figure 13:
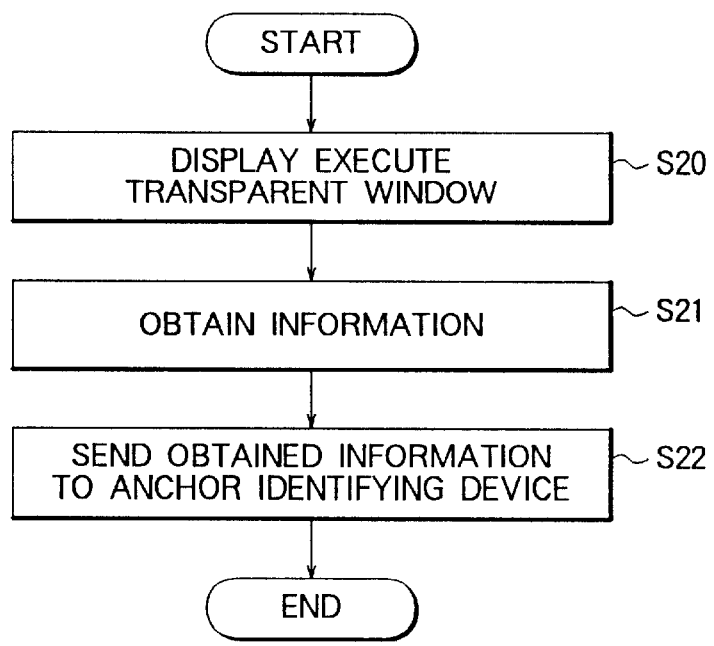
FIG. 13 is a flowchart showing an operation of the information obtaining device for obtaining the information through the transparent window.

This information obtaining device 1, as shown in FIG. 13, to begin with, in step S20, makes the transparent window unit 26 display the transparent window on the window of the linking-source software 7. In step S21, the window information obtaining unit 27 obtains a window event inputted from the user with respect to the transparent window unit 26, and in step S22 sends the obtained information to the anchor identifying device 2.

Accordingly, in the embodiment 2, the information obtaining device 1 involves the use of the transparent window unit 26 in order to obtain the information to the linking-source software 7, whereby the software linkage can be actualized even in such a case that the information from the operating system 23 to the linking-source software 7 can not be obtained instead.

Embodiment 3

The embodiment 1 discussed above has dealt with the case where the information obtaining device 1 receives the information from the operating system 23. Previously registered information can be also, however, obtained from the linking-source software 7.

An internal configuration and an operation flow of the information obtaining device 1 in the embodiment 3 will be explained with reference to FIGS. 14 and 15.

Figure 14:
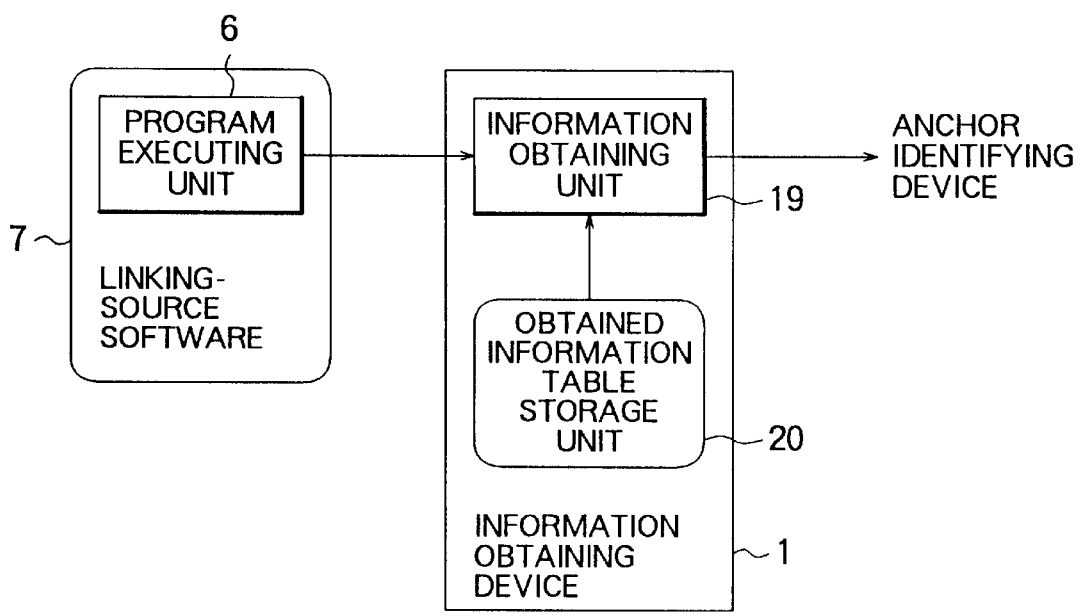
FIG. 14 is a diagram illustrating an internal construction of the information obtaining device for obtaining preset information.

As shown in FIG. 14, the information obtaining device 1 includes as internal components an obtained information table storage unit 20 in which the information to be obtained is registered and accumulated, and an information obtaining unit 19 for obtaining the information registered in the obtained information table storage unit 20.

Figure 15:
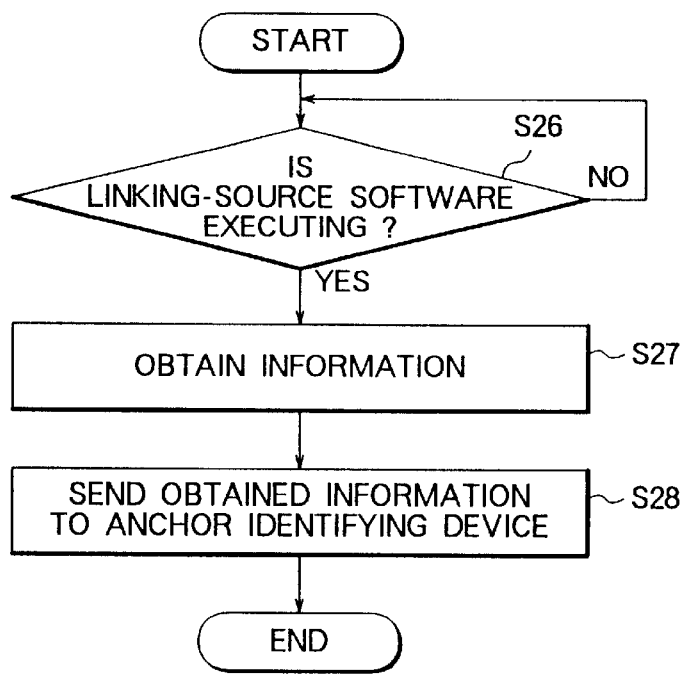
FIG. 15 is a flowchart showing the operation of the information obtaining device for obtaining the preset information.

This information obtaining device 1, as shown in FIG. 15, to start with, in step S26, makes the information obtaining unit 19 confirm whether or not the software registered in the obtained information table storage unit 20 is during execution. If on the execution, in step S27, the information obtaining device 1 obtains the information registered as the obtained information in the obtained information table storage unit 20 from the linking-source software 7, and in step S28 transmits the information to the anchor identifying device 2.

At this time, a content of an obtained information table in the obtained information table storage unit 20 in the case of obtaining the information from an object of the window displayed by the linking-source software 7, is as shown in FIG. 16. In this table, the information for specifying the linked software such as a name of the linking-source software is indispensable information, and other items of information are to be processed only when they are set. Note that this obtained information table storage unit 20 can also register and accumulate the information in the form of, e.g., an outside file so that the user can freely define and change it.

Accordingly, in the embodiment 3, it is possible to actualize the software linkage on the basis of the obtained information with the displayed content of the linking-source software 7 such as receiving, from the linking-source software 7, the information unobtainable from the operating system, e.g., the information disclosed outside by the linking-source software 7 by presetting the obtained information in the information obtaining device 1.

Embodiment 4

Further, the embodiment 3 discussed above has dealt with the case where the information is obtained from the object of the window displayed by the linking-source software. The linking-source software 7 is, however, capable of receiving the information that can be referred to from outside.

In this case, according to the construction of the information obtaining device 1 shown in FIG. 14, the obtained information storage unit 20 in the embodiment 4, as shown in FIG. 17, registers and accumulates a content of obtainment and a name of a variable which corresponds to a name of the linking-source software.

Embodiment 5

Further, the embodiment 3 discussed above has dealt with the case where the information is obtained from the object of the window displayed by the linking-source software. It is, however, possible to obtain the information from a specified address within the information processor.

In this case, according to the construction of the information obtaining device 1 shown in FIG. 14, the obtained information table storage unit 20 in the embodiment 4, as shown in FIG. 18, registers and accumulates a content of obtainment corresponding to an obtainment address.

Embodiment 6

Furthermore, the embodiment 3 discussed above has dealt with the case where the information is obtained from the object of the window displayed by the linking-source software. It is, however, feasible to obtain, if there exists information to be outputted during an execution by the linking-source software, the anchor information from this information.

In this case, according to the construction of the information obtaining device 1 shown in FIG. 14, the obtained information table storage unit 20 in the embodiment 4, as shown in FIG. 19, registers and accumulates a content of obtainment corresponding to a name of file.

Embodiment 7

Next, the embodiment 1 discussed above has dealt with the case of using the name of software as an item of the anchor information in the anchor identifying device 2. An event may also, however, be used as an item of the anchor information. Given as events are, for instance, mouse button-down, a mouse shift, a key input, activation of the window, etc. Further, the events occur through, e.g., a user input, a software process, via a network from a remote machine, etc.

In this case, the anchor information storage unit 32 within the anchor identifying device 2 shown in FIG. 6 registers and accumulates, as shown in FIG. 20, the event corresponding to the anchor ID in the form of an anchor information table.

Embodiment 8

Further, the embodiment 1 discussed above has dealt with the case of using the name of software as an item of the anchor information in the anchor identifying device 2. Coordinates inputted by the input means such as the mouse and the trackball may also, however, be set as an item of the anchor information.

In this instance, the anchor information storage unit 32 within the anchor identifying device 2 shown in FIG. 6 registers and accumulates, as shown in FIG. 21, the coordinates corresponding to the anchor ID in the form of an anchor information table.

Embodiment 9

Further, the embodiment 1 discussed above has dealt with the case of using the name of software as an item of the anchor information in the anchor identifying device 2. Key information inputted by the input means such as the keyboard may also, however, be set as an item of the anchor information.

In this case, the anchor information storage unit 32 within the anchor identifying device 2 shown in FIG. 6 registers and accumulates, as shown in FIG. 22, the key information corresponding to the anchor ID in the form of an anchor information table.

Accordingly, in the embodiments 7 to 9, it is possible to actualize the software linkage based on the unified operation within the information processor without depending on the software by setting the information such as the events, the coordinates and the key information other than the software as the items of the anchor information in the anchor identifying device 2.

Embodiment 10

Next, the embodiment 1 discussed above has dealt with the case of using the name of software as an item of the anchor information in the anchor identifying device 2. Window status information may also, however, be set as an item of the anchor information. The window status information may be, e.g., displaying in icons, maximization of display, activation, a page shift, a cursor shift, etc.

In this case, the anchor information storage unit 32 within the anchor identifying device 2 shown in FIG. 6 registers and accumulates, as shown in FIG. 23, the window status corresponding to the anchor ID in the form of an anchor information table.

Accordingly, in the embodiment 10, it is possible to actualize an automatic software linkage based on a transition of the window status even if there is no user input by setting the window status information as an item of the anchor information.

Embodiment 11

Next, the embodiment 1 discussed above has dealt with the case of using the name of software as an item of the anchor information in the anchor identifying device 2. A name of object of the window which receives the user input may also, however, be set as an item of the anchor information. The name of an object is usually the only piece of information recognizable within the window and may be, e.g., a button, a label, etc.

In this case, the anchor information storage unit 32 within the anchor identifying device 2 shown in FIG. 6 registers and accumulates, as shown in FIG. 24, the name of an object corresponding to the anchor ID in the form of an anchor information table.

Embodiment 12

Moreover, the embodiment 1 discussed above has dealt with the case of using the name of software as an item of the anchor information in the anchor identifying device 2. A name of file kept open which is displayed in the window may also, however, be set as an item of the anchor information.

In this case, the anchor information storage unit 32 within the anchor identifying device 2 shown in FIG. 6 registers and accumulates, as shown in FIG. 25, the name of the open file corresponding to the anchor ID in the form of an anchor information table.

Embodiment 13

Furthermore, the embodiment 1 discussed above has dealt with the case of using the name of software as an item of the anchor information in the anchor identifying device 2. Information held per software may also, however, be set as an item of the anchor information. The information held per software may be, e.g., a page number, a frame number, etc. displayed in the window.

In this case, the anchor information storage unit 32 within the anchor identifying device 2 shown in FIG. 6 registers and accumulates, as shown in FIG. 26, the page number corresponding to the anchor ID in the form of an anchor information table.

Accordingly, in the embodiments 11 to 13, it is possible to actualize the software linkage matching with the operation of the software by setting the information held per software such as the name of object, the name of file and the page number as the items of the anchor information in the anchor identifying device 2.

Embodiment 14

Further, the anchor information table storage unit 32 is also capable of registering and accumulating the information with a combination of some or the whole of items of the anchor information described above.

In this case, the anchor information table storage unit 32 within the anchor identifying device 2 shown in FIG. 6 registers and accumulates, as shown in FIG. 27, the name of the software, the event, the coordinates, the key information, the window status, the name of the object, the name of the open file and the page number which each correspond to the anchor ID in the form of an anchor information table.

Accordingly, in the embodiment 14, it is feasible to actualize a much more elaborate software linkage because of enabling a much greater number of patterns to be anchor-registered by setting the information as the anchor information with the combination of some or the whole of items of the anchor information in the anchor identifying device 2.

Embodiment 15

Next, the anchor identifying device 2 in the embodiment 1 shown in FIG. 6 may be provided with an information sending unit in order that the obtained information not included in the condition of the anchor information table storage unit 32 can be sent to the linking-source software 7.

Figure 28:
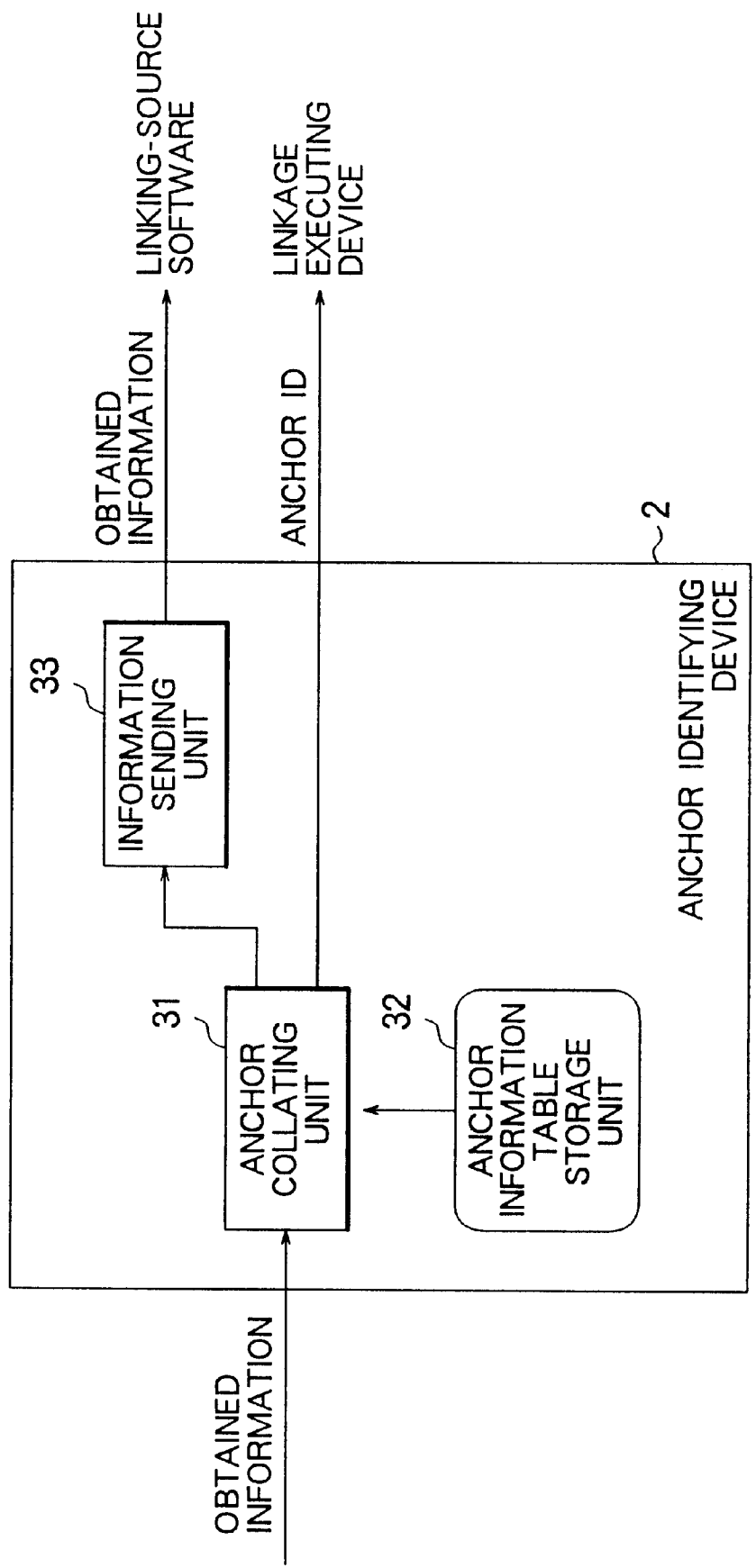
FIG. 28 is a diagram showing an internal construction of an anchor identifying device including an information sending unit.

That is, the anchor identifying device 2 in an embodiment 15 further includes as an internal component, as shown in FIG. 28, in addition to the anchor collating unit 31 and the anchor information table storage unit 32, an information sending unit 33 for sending, if there is no such anchor information that the information obtained by the information obtaining device 1 meets with the condition, the information to a program of the linking-source software 7.

Hence, in accordance with the embodiment 15, the anchor identifying device 2 sends to the linking-source software 7 the obtained information not included in the condition of the anchor information, whereby the process of the linking-source software can be executed. Therefore, an enhancement of the operation can be expected.

Embodiment 16

Furthermore, the anchor identifying device 2 in the embodiment 1 shown in FIG. 6 may be provided with an anchor registering unit in order that the anchor information can be registered in the anchor information table storage unit 32 anytime from outside.

Figure 29:
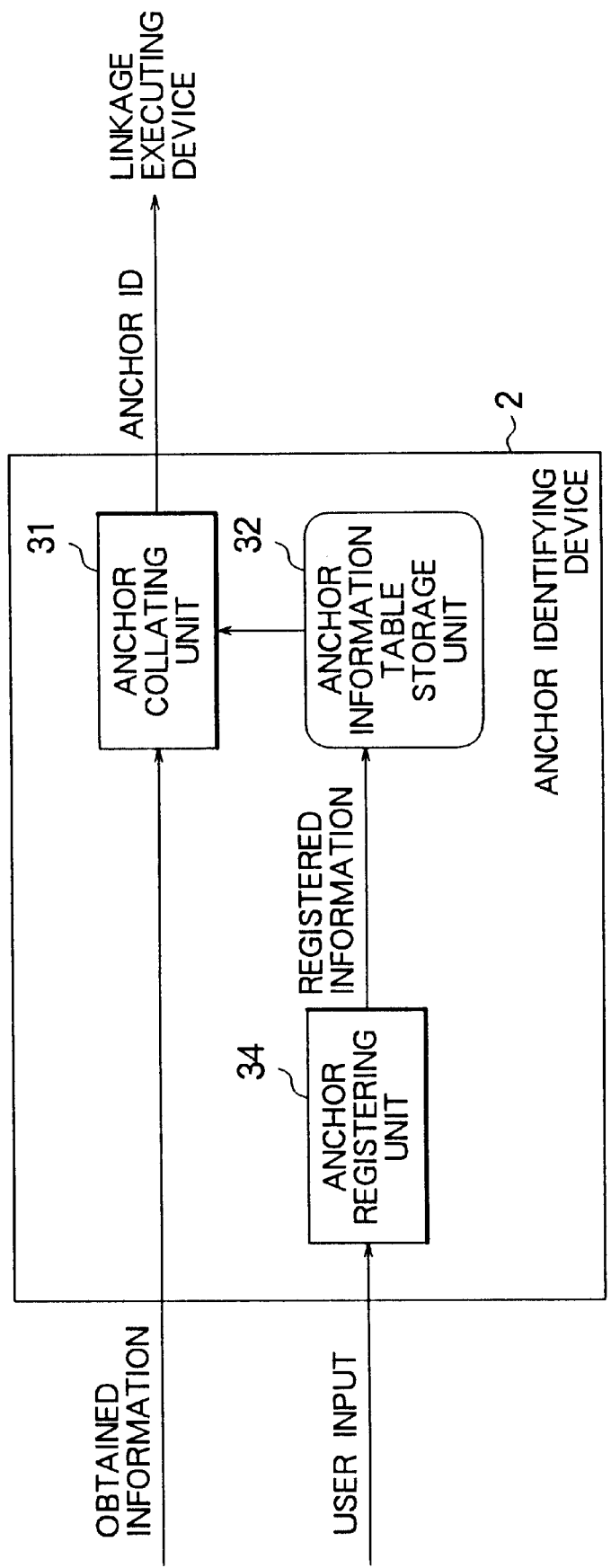
FIG. 29 is a diagram showing an internal construction of the anchor identifying device including an anchor registering unit.

That is, the anchor identifying device 2 in an embodiment 16 further includes as an internal component, as shown in FIG. 29, in addition to the anchor collating unit 31 and the anchor information table storage unit 32, an anchor registering unit 34 for registering the anchor information table storage unit 32 with the anchor information.

Hence, in accordance with the embodiment 16, the anchor identifying device 2 is capable of implementing the anchor registration anytime from outside, thereby making it feasible to actualize the software linkage corresponding to a using condition. Therefore, the enhancement of the operation can be expected.

Embodiment 17

Further, the anchor identifying device 2 in the embodiment 1 shown in FIG. 6 may also be provided with an obtained information accumulating unit for accumulating the obtained information in order to set a combination of plural pieces of input information as anchor information.

Figure 30:
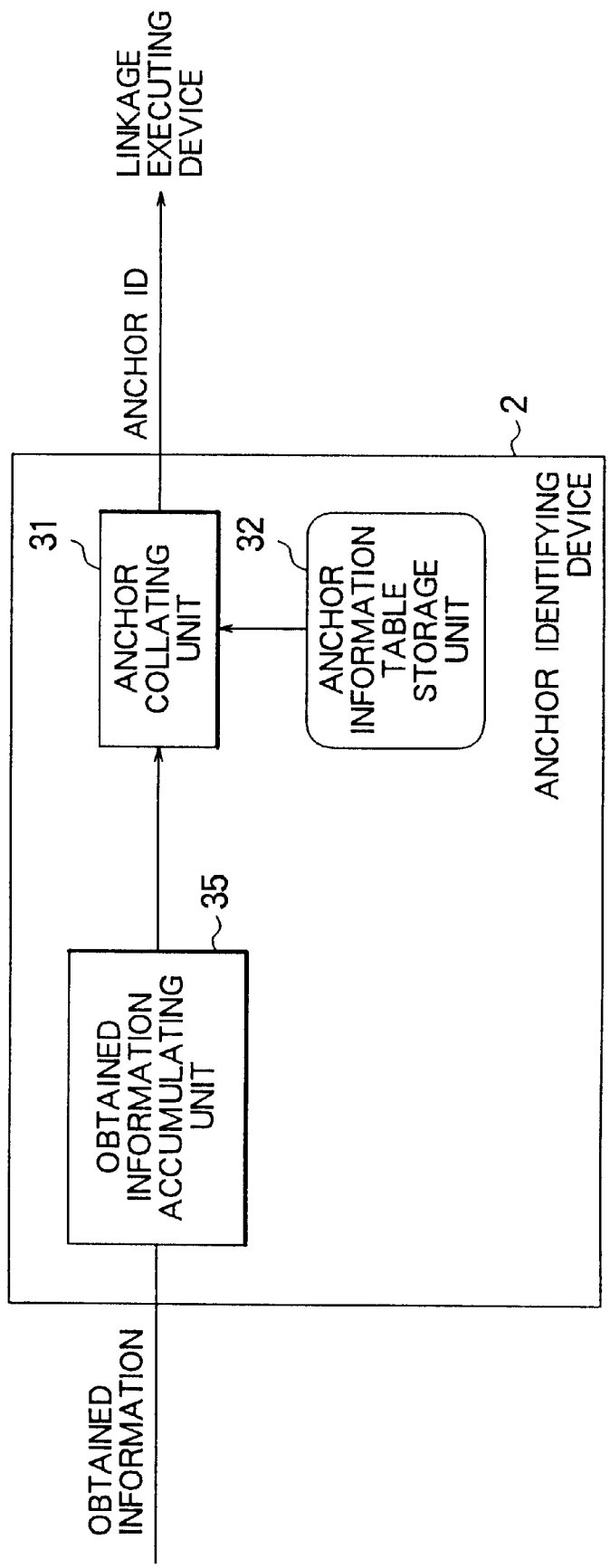
FIG. 30 is a diagram showing an internal construction of the anchor identifying device including an obtained information accumulating unit.

That is, the anchor identifying device 2 in an embodiment 17 further includes as an internal component, as shown in FIG. 30, in addition to the anchor collating unit 31 and the anchor information table storage unit 32, an obtained information accumulating unit 35 for accumulating the information obtained by the information obtaining device 1, and the anchor collation based on the combination of plural pieces of information accumulated in the obtained information accumulating unit 35, can be carried out by the anchor collating unit 31.

Therefore, in accordance with the embodiment 17, the software linkage to the independently set operation can be carried out by setting the combination of plural pieces of information as the anchor information in the anchor identifying device 2. It is therefore feasible to register the linkage in an operation which is not normally implemented, and it can be expected that a malfunction of the software linkage due to an operational mistake can be reduced.

Embodiment 18

Furthermore, the anchor identifying device 2 in the embodiment 1 shown in FIG. 6 may also be provided with a linkage anchor accumulating unit for accumulating plural pieces of anchor information in which the obtained information is included in the condition thereof in order to simultaneously or sequentially execute a plurality of linkages.

Figure 31:
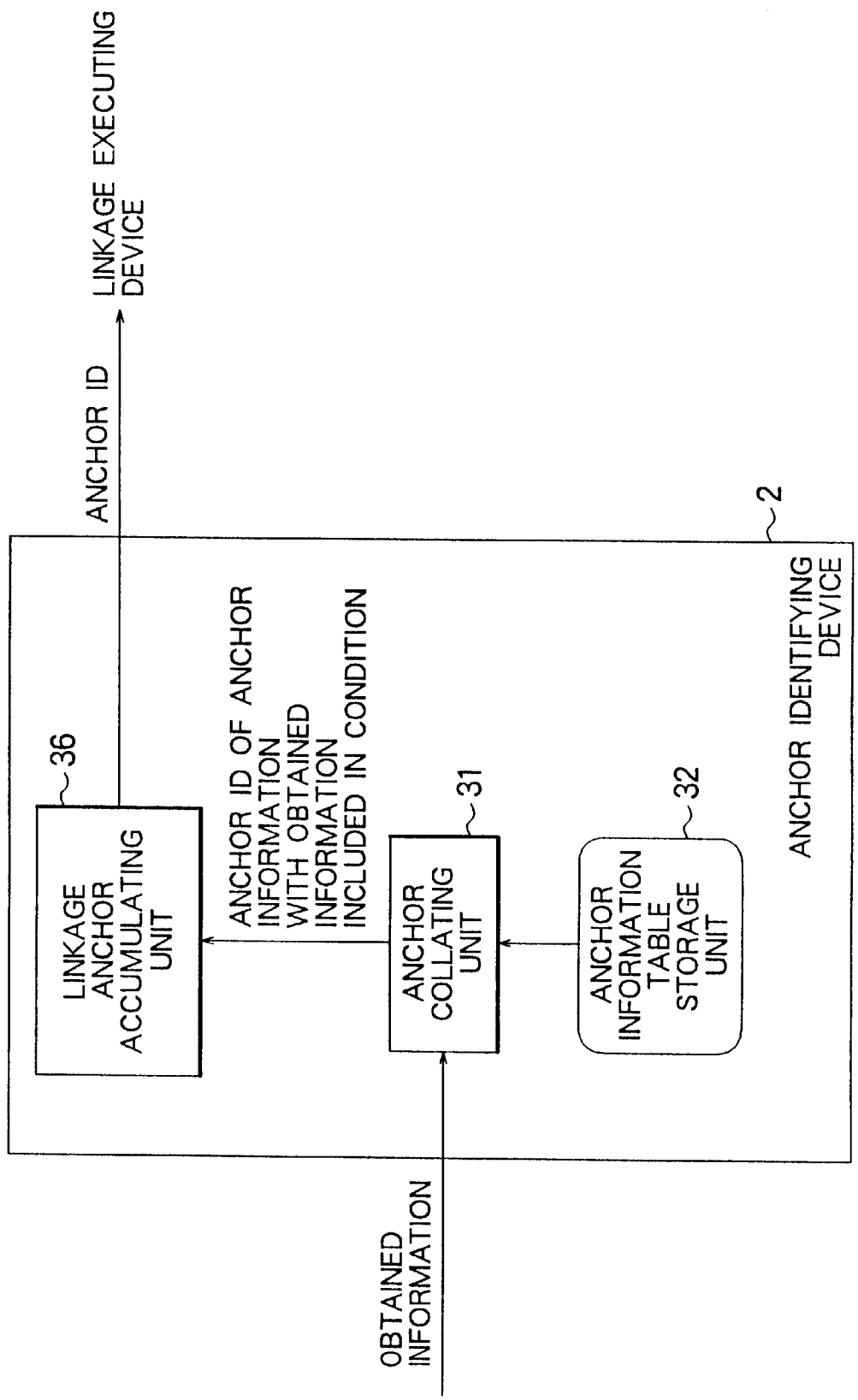
FIG. 31 is a diagram showing an internal construction of the anchor identifying device including a linkage anchor accumulating unit.

That is, the anchor identifying device 2 in an embodiment 18 further includes as an internal component, as shown in FIG. 31, in addition to the anchor collating unit 31 and the anchor information table storage unit 32, a linkage anchor accumulating unit 36 for accumulating all pieces of anchor information (the anchor IDs of the anchor information including the obtained information as a condition) judged to meet with the condition in the anchor collating unit 31, and outputting the information to the linkage executing device 3.

Hence, in accordance with the embodiment 18, the anchor identifying device 2 accumulates plural pieces of anchor information, whereby the plurality of linking processes can be executed.

Embodiment 19

Moreover, in the embodiment 1 discussed above, there may also be provided an anchor display device for displaying on the screen the anchor information identified or registered and accumulated by the anchor identifying device 2, and informing the user of the anchor information.

Figure 32:
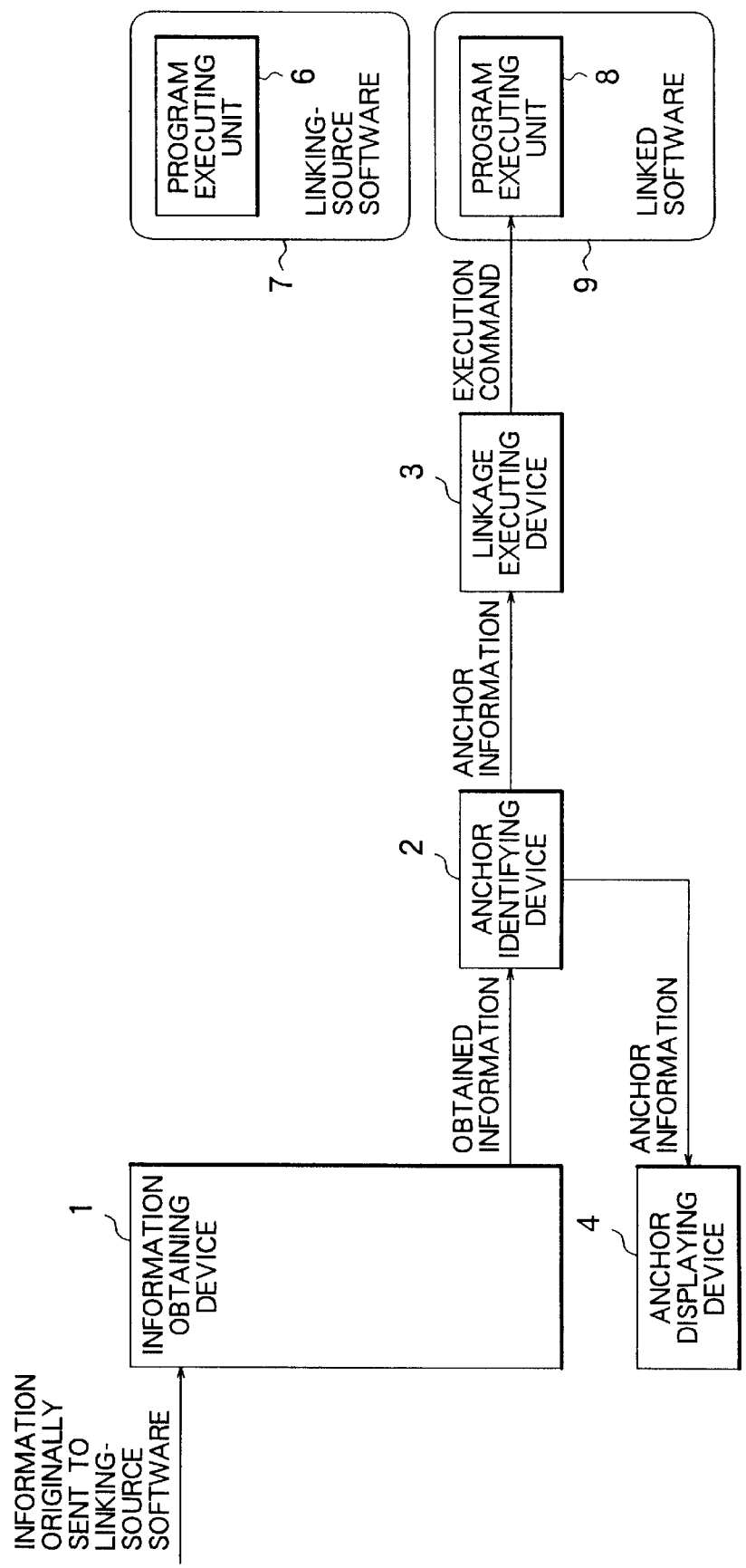
FIG. 32 is a diagram illustrating a construction of the software linking system including an anchor display device.

Namely, the software linking system in the embodiment 19 further includes, as shown in FIG. 32, an anchor display device 4 for displaying the anchor information, which device is added to the embodiment 1 shown in FIG. 1.

The anchor display device 4 is capable of displaying all or some pieces of the anchor information. The anchor display device 4 is also capable of displaying only the anchor information identified by the anchor identifying device 2.

Hence, in accordance with the embodiment 19, the user can be visually informed of where the software linkage occurs by displaying the anchor information on the screen, and it can be therefore expected that the operation is enhanced.

Embodiment 20

Next, a construction and an operation flow of the software linking system in the information processor in an embodiment 20 according to another aspect of the invention, will be described with reference to FIGS. 33 and 34.

Figure 33:
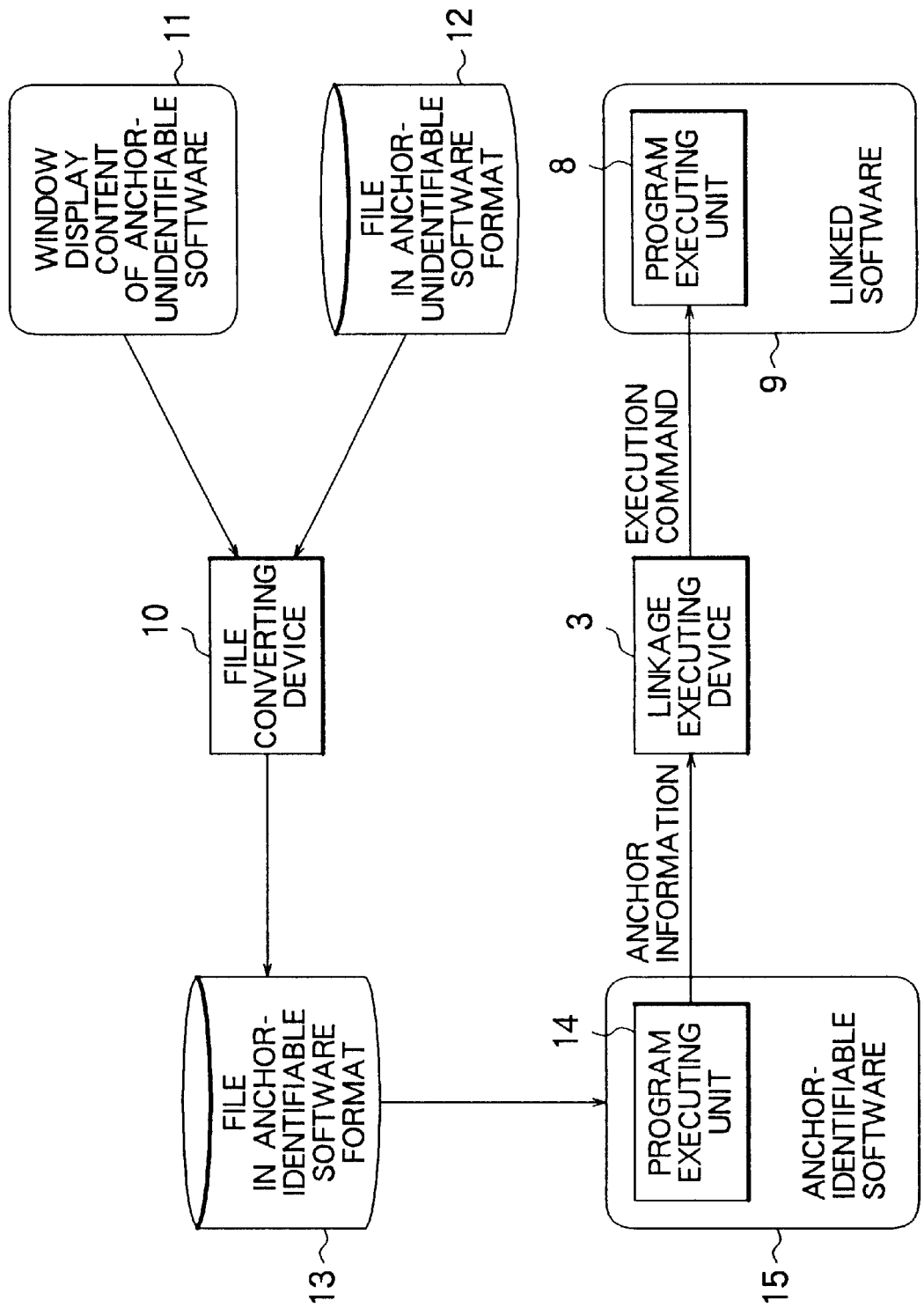
FIG. 33 is a diagram illustrating a construction of the software linking system in an information processor according to another aspect of the invention.

The software linking system for the information processor according to another aspect of the invention is the information processor having the operating system in which plural sets of software are simultaneously operable, and is constructed of, as illustrated in FIG. 33, a file converting device 10 for converting a file of the linking-source software or a content displayed in the window into an anchor-identifiable software format, and the linkage executing device 3 for executing the linked software corresponding to the anchor information identified by the anchor-identifiable software.

The file converting device 10 described above converts a window display content 11 of anchor-unidentifiable software or a file 12 in an anchor-unidentifiable software format into a file 13 in an anchor-identifiable software format. The linkage executing device 3 outputs an execution command to the program executing unit 8 of the linked software 9 which corresponds to the anchor information identified by a program executing unit 14 of anchor-identifiable software 15.

Figure 34:
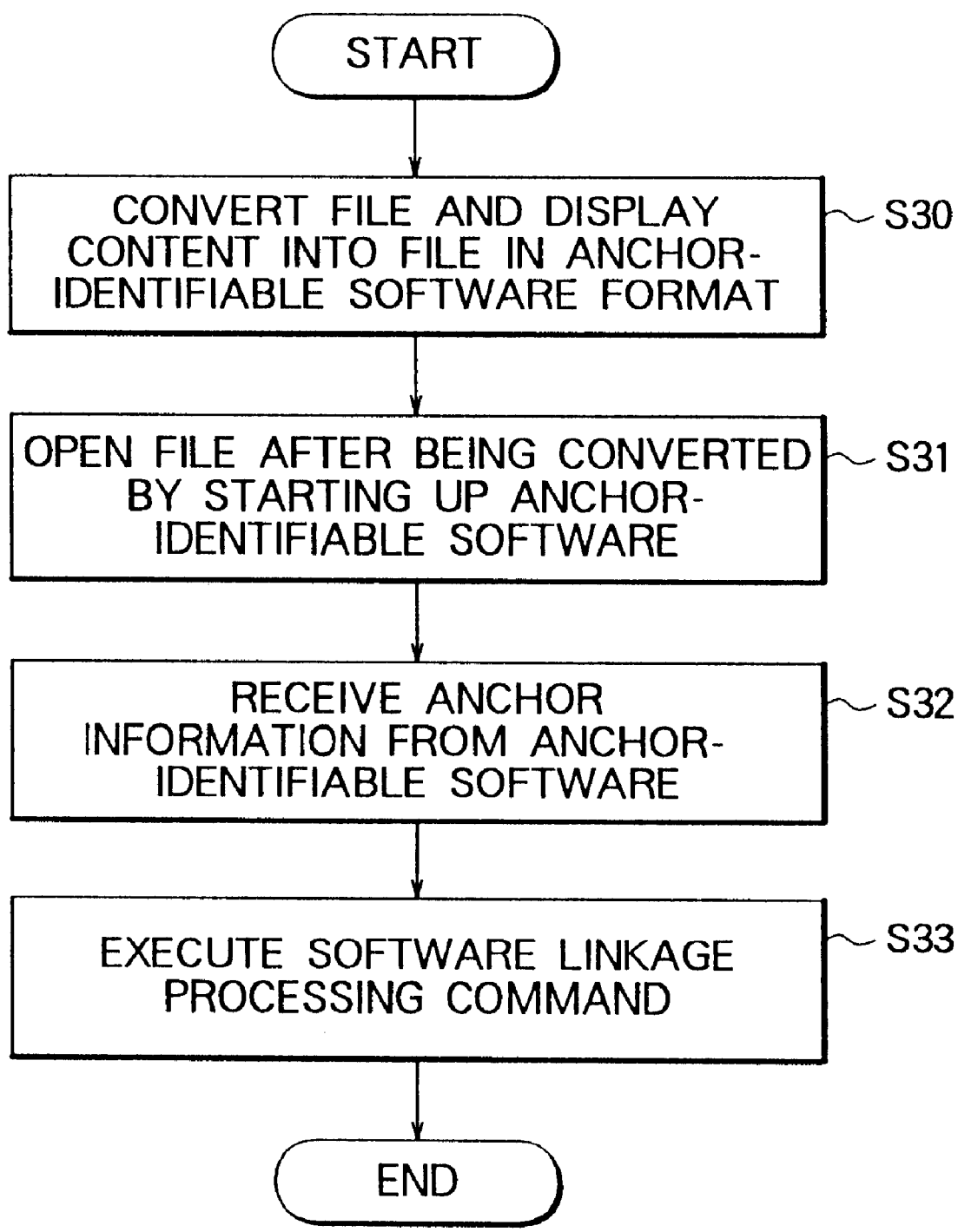
FIG. 34 is a flowchart showing an operation of the software linking system shown in FIG. 33.
Figure 35:
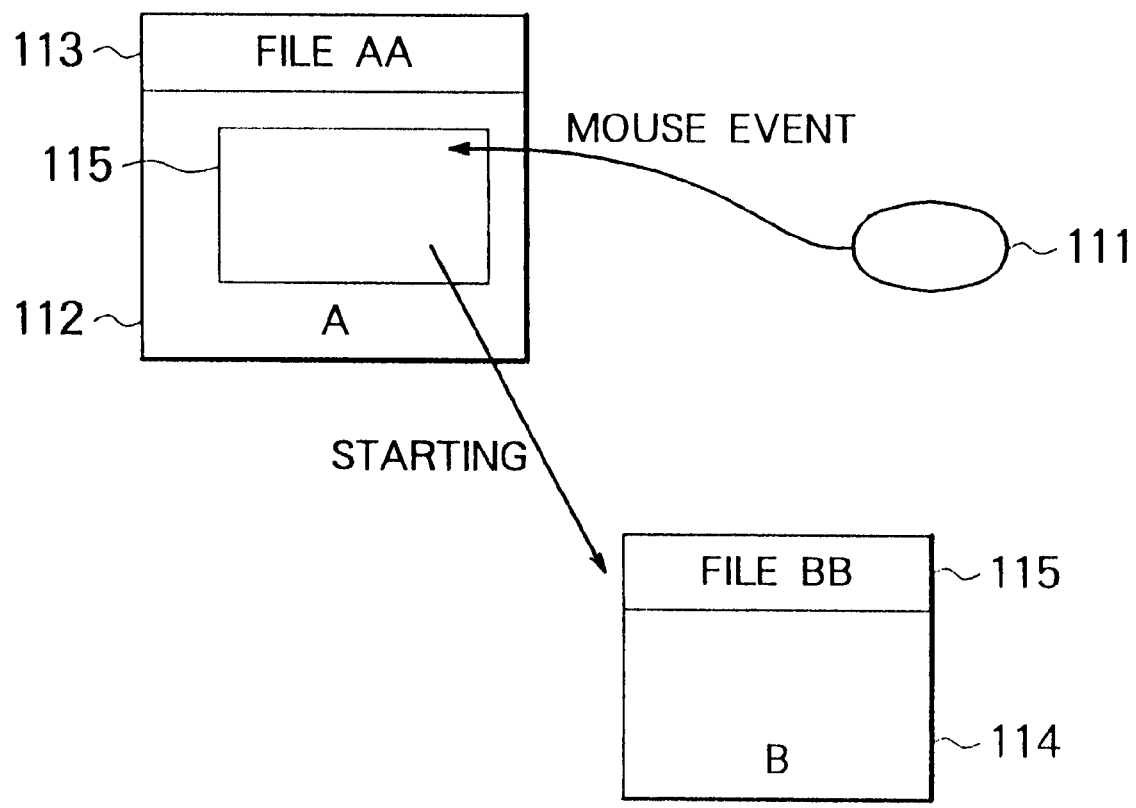
FIG. 35 is an explanatory diagram showing an example of a screen in the software linkage based on an OLE according to the prior art.

Namely, in the software linking system in the information processor according to another aspect of the invention, as shown in FIG. 34, at first, in step S30, the file converting device 10 converts the anchor-unidentifiable software file 12 and the window display content 11 in the anchor-unidentifiable software format, into the file 13 in the anchor-identifiable software format. The anchor-identifiable software format is, for example, a bitmap format, an AVI format, etc. Next, in step S31, the file 13 in the anchor-identifiable software format is opened by starting up the anchor-identifiable software 15, and, if the anchor information is sent from the anchor-identifiable software 15, the linkage executing device 3 obtains linkage information corresponding to the anchor information and issues a command to process this piece of linkage information.

Hence, in accordance with the embodiment 20, the software linkage can be actualized without changing the linking-source software 7 itself by converting the window display content 11 and the file 12 in the anchor-unidentifiable software format into the file 13 in the anchor-identifiable software format.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As discussed above, according to the software linking system in the information processor of the present invention, the anchor identifying means judges whether or not there exists the anchor information for specifying the linkage condition under which the linking-source software recognizes the linked software on the basis of the information obtained by the information obtaining means for obtaining the information within the information processor, and the linkage executing means executes the linked software performing the linking operation corresponding to the anchor information. Therefore, even the software not incorporating the function to process the anchor can become the linking-source in the software linkage.

What is claimed is:

1. A software linking system in an information processor having an operating system in which plural sets of software are operable, comprising:

an information obtaining means for obtaining information within the information processor;

an anchor identifying means for judging whether or not there exists anchor information for specifying a linkage condition under which linking-source software, which is executed in said operating system to open and display contents of a first file in a display window, recognizes linked software on the basis of the information obtained by said information obtaining means and without requiring the linking-source software to execute an anchor function; and a linkage executing means for executing the linked software to perform a linking operation corresponding to the anchor information identified by said anchor identifying means, said linked software being executed in said operating system to open and display contents of a second file in a display window without requiring the use of an Object Linking and Embedding (OLE) compliant linkage mechanism.

2. The software linking system in an information processor as recited in claim 1, wherein said information obtaining means includes:

an information obtainment registering unit for registering the operating system with an information obtainment in order to receive instead of the linking-source software the information sent by said operating system of said information processor; and an information receiving unit for receiving the information sent from said operating system.

3. The software linking system in an information processor as recited in claim 1, wherein said information obtaining means includes:

a transparent window unit for covering a window displayed on a screen by the linking-source software; and a window information obtaining unit for obtaining information inputted to said transparent window unit.

4. The software linking system in an information processor as recited in claim 1, wherein said information obtaining means includes:

an obtained information table storage unit in which information to be obtained is registered and accumulated; and an information obtaining unit for obtaining the information registered in said obtained information table storage unit.

5. The software linking system in an information processor as recited in claim 1, wherein said anchor identifying means includes:

an anchor information table storage unit in which the anchor information is registered and accumulated; and an anchor collating unit for collating the information obtained by said information obtaining means with the information existing in said anchor information table storage unit.

6. The software linking system in an information processor as recited in claim 5, wherein said anchor identifying means further includes an information sending unit for sending, if there exists no such anchor information that the information obtained by said information obtaining means meets with the condition, the information to a program of the linking-source software.

7. The software linking system in an information processor as recited in claim 5, wherein said anchor identifying means further includes an anchor registering unit for registering said anchor information table storage unit with the anchor information.

8. The software linking system in an information processor as recited in claim 5, wherein
said anchor identifying means further includes obtained information accumulating means for accumulating the information obtained by said information obtaining means; and
said anchor collating unit makes possible the anchor collation based on a combination of plural pieces of information accumulated in said obtained information accumulating means.

9. The software linking system in an information processor as recited in claim 5, wherein said anchor identifying means further includes a linkage anchor accumulating unit for accumulating all of the anchor information judged to meet with the condition in said anchor collating unit, and outputting the anchor information to said linkage executing means.

10. The software linking system in an information processor as recited in claim 1, wherein said linkage executing means includes:
a linkage information table storage unit for registering and accumulating the software linkage information;
a linkage information obtaining unit for obtaining, from said linkage information table storage unit, the software linkage information corresponding to the anchor information obtained from said anchor identifying means; and
a linkage information executing unit for issuing an execution command to the linked software from the software linkage information obtained by said linkage information obtaining unit.

11. The software linking system in an information processor as recited in claim 1, further comprising an anchor displaying means for displaying on a screen the anchor information identified or registered and accumulated by said anchor identifying means.

12. A software linking application for use in an information processing system having an operating system in which at least one set of software is operable, comprising:
a software linking information obtaining unit for obtaining software linking information from within the information processing system;
an anchor identifying unit, operatively connected to said software linking information obtaining unit, determining whether anchor information exists for identifying at least one linkage condition under which a linking-source software, which is executed in said operating system to open and display contents of a first file in a display window, recognizes a linked software on the basis of the software linking information obtained by said software linking information obtaining unit and without requiring the linking-source software to execute an anchor function; and
a linkage execution unit, operatively connected to the anchor-identifying unit, executing the linked software to perform at least one linking operation utilizing the anchor information identified by the anchor identifying unit, said linked software being executed to open and display contents of a second file in a display window without requiring the use of an Object Linking and Embedding (OLE) compliant linkage mechanism.

13. An anchor identifying unit utilized by a software linking application in an information processing system having an operating system in which at least one set of software is operable, comprising:
an anchor collating unit for receiving information from within the information processing system and extracting potential anchor information from the information; and
an anchor information storage unit for storing anchor information,
wherein said anchor identifying unit retrieves at least one set of stored anchor information from the anchor information storage unit and compares the extracted potential anchor information to the at least one retrieved set of stored anchor information, and if at least one match is found, sending the at least one matching set of stored anchor information to a linkage information executing unit, thereby initiating a linking operation to link linking-source software, which is executed in said operating system to open and display contents of a first file in a display window, with linked software, which is executed based on said at least one matching set of stored anchor information to open and display contents of a second file in a display window without requiring the linking-source software to execute an anchor function without requiring the use of an Object Linking and Embedding (OLE) compliant linkage mechanism.

14. The software linking system as recited in claim 1, wherein said information obtained by said information obtaining means relates to a user-input event in the display window that displays contents of said first file.

15. The software linking application as recited in claim 12, wherein said software linking information obtained by said software linking information obtaining unit relates to a user-input event in the display unit that displays contents of said first file.

16. the anchor identifying unit as recited in claim 13, wherein said anchor collating unit receives information from within the information processing system that relates to a user-input event in the display window that displays content of said first file.

* * * * *